Oct. 8, 1963
L. M. GREENE
3,106,185
INDICATOR
Filed Jan. 10, 1961
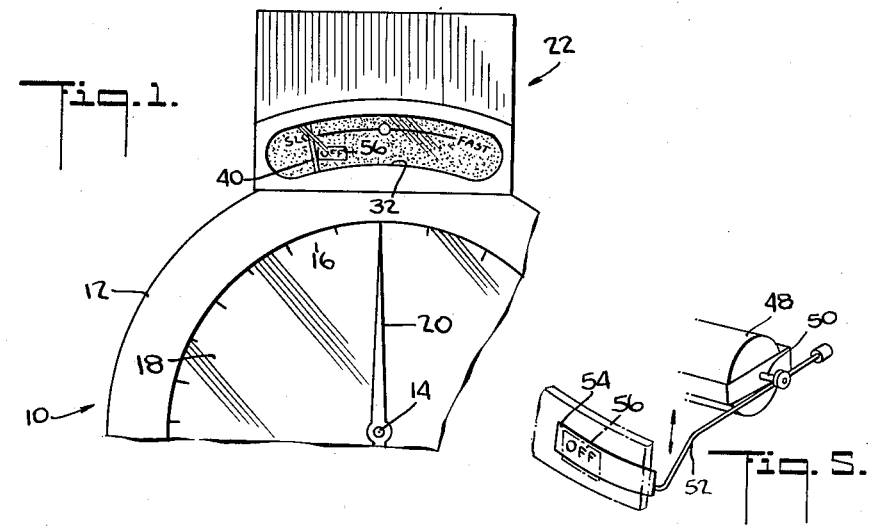
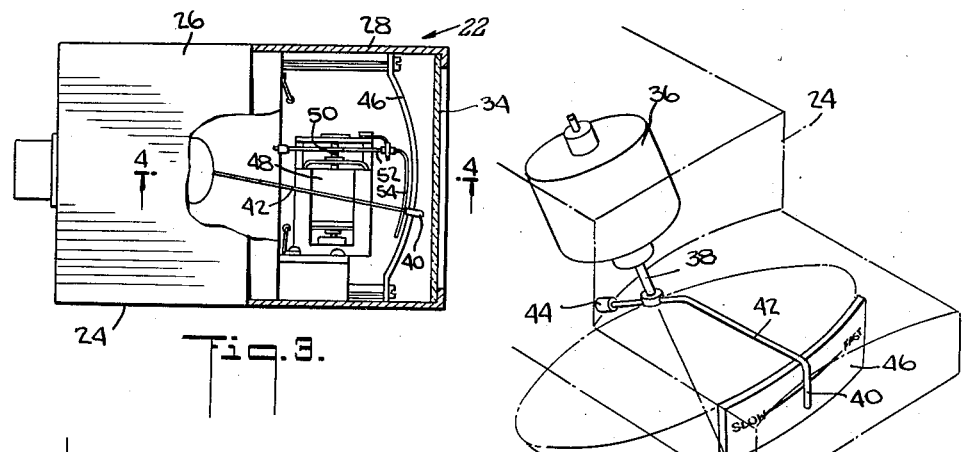
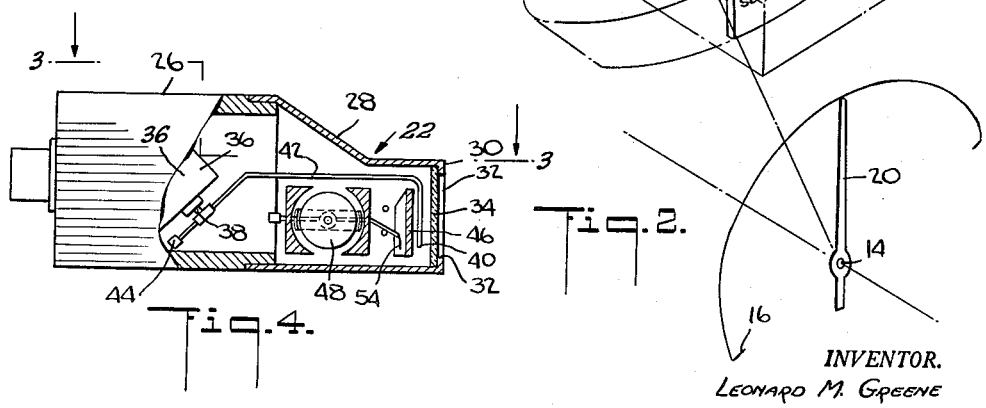
INVENTOR.
LEONARD M. GREENE
BY
ATTORNEYS United States Patent Office 3,106,185
Patented Oct. 8, 1963

3,106,185
INDICATOR
Leonard M. Greene, Chappaqua, N.Y., assignor to Safe
Flight Instrument Corporation, White Plains, N.Y., a
corporation of New York
Filed Jan. 10, 1961, Ser. No. 81,845
9 Claims. (Cl. 116—129)

This invention relates to indicators. The present invention finds its principal use in sites such as airplane cockpits and, specifically, the cockpit panels of multi-engine airplanes where space is limited and a large number of indicators are present.

One widely used type of conventional indicator is that in which a marker, such for instance as a needle, rotates about an axis, the needle turning in a plane over the face of a flat dial and usually behind a flat transparent protective panel. Quite often such instruments have the dials marked in graduations to provide a scale against which the movable marker can be read; other instruments of this character simply are read by observing the angular position of the marker. Customarily, the axis of rotation of the needle is perpendicular to the face of the dial and perpendicular to the cockpit panel. The markers of these indicators usually are turned by a drive mechanism which is responsive to an input signal, the drive mechanism frequently being of the galvanometer type. According to standard practice, the drive mechanism is located in back of the dial around or adjacent the axis of rotation of the marker.

Due to the rotational sweep of the needle, indicators of the character described, which I will hereinafter refer to as "swinging marker" indicators, occupy a rather large space on a mounting panel. A great deal of this space is dead; that is to say, a considerable portion of the arc swept by the needle is idle since it is customary only to read the tip portion of the needle. However, the portion of the needle between the tip (marker) and the axis of rotation is required for proper operation of the indicator, although it serves no useful reading function.

When two such indicators are employed it is difficult to place their markers in juxtaposition because each of the indicators individually occupies a considerable dead space, so that heretofore it has not been considered practical to have the markers of swinging needle indicators traverse juxtaposed coincident arcs. In addition to the aforesaid dead space, the physical bulk of the actuating mechanisms could not be accommodated, since necessarily if the two markers turn about coincident axes, one actuating mechanism would have to be behind or around the other.

It is an object of my present invention to provide a swinging marker type of indicator which substantially reduces the aforesaid dead space.

It is another object of my invention to provide an indicator of the character described having a swinging marker that turns about an axis of rotation which intersects the front face of the indicator at a point outside the indicator casing.

It is another object of my invention to provide a second indicator of the character described which can be used in conjunction with a first conventional swinging marker indicator in a fashion such that the axes of rotation of the two swinging markers apparently are coincident and yet which has the drive mechanism for the second indicator remote from the drive mechanism for the first indicator and spaced from the axis of rotation of the marker of the first indicator.

It is another object of my invention to provide an indicator of the character described in which a swinging marker appears to travel through an arc having a center of rotation that is remote from the casing of the indicator.

It is another object of my invention to provide an indicator of the character described which is comparatively shallow in height, that is to say has a height which is less than the radius of the arc through which the marker appears to swing.

It is another object of my invention to provide an indicator of the character described which is compact and yet requires no unusual parts, or expedients of a complex, cumbersome or costly nature.

Other objects of my invention in part will be obvious and in part will be pointed out hereinafter.

In the accompanying drawings, in which is shown one of the various possible embodiments of my invention, FIG. 1 is a front view of a novel indicator constructed in accordance with my invention, the same being shown in association with a portion of a conventional swinging marker indicator;

FIG. 2 is an isometric view of the principal parts of my novel indicator;

FIG. 3 is a top partly broken away view of the indicator;

FIG. 4 is a fragmentary sectional view taken substantially along the line 4—4 of FIG. 3; and FIG. 5 is a fragmentary perspective view of an auxiliary indicator which may be employed in conjunction with my novel indicator.

Referring now in detail to the drawings, the reference numeral 10 denotes a standard swinging marker indicator. Said indicator comprises a casing 12 within which there is housed a driving mechanism (not shown) that angularly rotates a marker shaft 14 as a function of an input. The marker shaft is mounted to turn perpendicular to a calibrated dial 16 which, as is customary, is flat, i.e., plane, the dial being covered, if desired, by a transparent flat protective panel 18. The shaft 14 mounts a marker such as a needle 20 the tip (marker) of which will swing through a circular arc about the shaft 14 as a center and traverse the scale on the dial 16. The path of travel of the tip of the needle is in a plane that is parallel to the dial 16 and to the transparent protective panel 18. The needle sweeps through an extended arc which usually ranges from about 90° to 360°.

It will be appreciated that there is a large amount of dead space in the indicator 10, the dead space constituting the circular area between the shaft 14 and the tip (marker) of the needle 20. From a functional point of view the only requisite elements for reading purposes are the tip of the needle (the marker) and the scale of the dial 16 against which the position of the marker is read. However, the dead space is necessary to physically support the moving tip of the needle, i.e. to provide an operative connection between the shaft 14 and the marker. Moreover, the driving mechanism for the needle i.e. for the shaft 14, customarily is located at the center of the instrument in back of the dial, thus prohibiting the location at the same site of another driving mechanism for a second indicator if such were desired.

However pursuant to the present invention I am able to provide a second indicator having a marker which appears to turn about the same axis of rotation as the needle (marker) 20 of the first indicator and does not preempt any of the space occupied by the first indicator either for movement of the second marker or for driving of the second marker shaft. It should be pointed out, nevertheless, that my invention is not to be limited to the use of my novel indicator as a second indicator in conjunction with a conventional indicator. However, because one of the principal uses of my invention consists in such a composite use of the two indicators my invention will be so described.

The reference numeral 22 denotes my new indicator, which is a second indicator, the same including a casing 24 which, for convenience, is subdivided into a rear section 26 and a front section 28 suitably connected thereto. The substantially flat front wall 30 of the front section is formed with an opening 32 in which there is located a substantially flat transparent protective panel 34. Where the two indicators 10 and 22 are employed jointly, the two protective panels 18 and 34 preferably are parallel and substantially coplanar. For example, if the two indicators are used in an airplane both said protective panels will be parallel to the instrument panel in which said indicators are mounted.

Contained within the casing 24 is a drive mechanism 36 for the indicator 22. Said drive mechanism may be of any suitable type and actuated by any kind of input. For example, the drive mechanism may comprise a galvanometer or a servo motor or the output end of a flexible cable. Regardless of the specific construction of the driving mechanism, the same includes an output shaft 38 the angular orientation of the axis of rotation of which is an essential feature of my present invention. More particularly the output shaft 38 is mounted to turn at an angle substantially different from 90° to the plane of the protective panel 34 (which for all practical purposes is parallel to the plane of the front wall 30 of the instrument housing) and substantially different from 90° to a normal to said panel and front wall. In the preferred form of my invention said angle is within about 20° to about 70° to the planes of said panel and front wall. Desirably the orientation of said output shaft 38 is such that an imaginary extension of the axis of rotation of said shaft in a direction toward the front of the casing 24 extends outside of said casing. If the indicator 22 is to be used in conjunction with a conventional indicator 10 that is located below the indicator 22 the imaginary extension of the axis of rotation of the output shaft 38 passes through the bottom wall of the casing 24. Obviously if the indicator 22 is located beneath the indicator 10 the imaginary extension of the axis of rotation of the output shaft 38 will extend through the top wall of the casing 26. If the indicator 22 is used by itself the direction of the imaginary extension of the axis of rotation of the shaft 38 will depend, as soon will be seen, upon the pseudo center of the arc about which the marker of the indicator 22 is apparently to swing.

In the preferred form of my invention the marker of the indicator 22 appears to swing about substantially the same center as the needle 20 and for this purpose the imaginary extension of the axis of rotation of the output shaft 38 passes through the intersection of the axis of rotation of the marker shaft 14 and the needle 20 of the first indicator 10.

In order to prevent physical interference between the two indicators the output shaft 38 is located within, i.e. terminates within, the casing 26 of the second indicator 22 so that there is no physical extension of this shaft.

The second indicator 22 includes a marker in the form of a stub needle 40 connected to an driven by the output shaft 38. However this marker is not, like the needle 20 disposed in a plane perpendicular to the axis of rotation of the shaft which drives it. To heighten the illusion that I wish to create, the length of the needle 40 is inclined at an angle other than 90° to the axis of rotation of the shaft 38. More specifically the length of said needle 40 is inclined to the output shaft 38 at an angle which is complementary to the angle between the axis of rotation of the output shaft 38 and a normal to the front face of the indicator 22 and, accordingly, of the front face of the indicator 10. In other words if the axis of rotation of the output shaft 38 is disposed at an angle of 40° to a normal to the front face of the indicator 22, the length of the needle 40 is at an angle of 50° to the axis of rotation of said shaft 38. Considered from a different point of view, the angle between the length of the needle 40 and the axis of rotation of the output shaft 38 for the driving mechanism of the indicator 22 is equal to the angle between said axis and the front face of the indicator 22.

A member such as a thin wire-like element 42 connects the output shaft 38 to the needle 40, the general direction of the length of said connecting element preferably being approximately normal to the front face of the casing when the marker is between its extreme positions, e.g. in mid-position. Optionally, a counter-balancing weight 44 is carried by the connecting element 42 on the side of the output shaft 38 diametrically opposed to the needle 40.

Due to the foregoing arrangement, actuation of the driving mechanism 36 will cause the needle 40 to travel through a path that is elliptical as projected on the plane of the front of the casing. Specifically said path is conical; i.e. the moving needle will generate a right-angled cone as the moving slant height thereof since the length of the needle if extended will intersect the axis of rotation of the shaft 38. Moreover the cone thus generated will have as its apex the point of intersection between the needle 20 and the needle shaft 14 of the first indicator 20 so that said cone will be tangent to the plane defined by the travel of the tip of the needle 20 of the first indicator.

The zone of tangency between the cone and the plane is a line and for positions of the needle 40 close to such line the needle effectively will move through an arcuate path of travel having as its pseudo center the point of intersection between the needle 20 and the needle shaft 14 of the first indicator.

Moreover this movement of the needle 40 will approximate movement in a plane so long as the angular deviation from the line of tangency is not excessive. As a matter of practice I have found that the swing of the needle can be as great as 30° to either side of said line of tangency before the departure from planarity becomes noticeable. Nevertheless during such swing the needle 40 experiences a change of angularity with respect to the axis of rotation of the needle 20 so that said needle 40 seems to be swinging about a pseudo center coincident with the axis of rotation of the needle 20.

It is pointed out that, as noted above, the angle through which the needle 40 can be swung and still retain its semblance of plane movement about the pseudo center lying outside its casing (the point where the imaginary extension of the axis of rotation of the output shaft 38 intersects the plane of the front face of the instrument casing 26) is necessarily limited, preferably not exceeding 60° (30° to either side of a central position) and desirably not exceeding 40° (20° to either side of a central position).

It may be mentioned that by employing visual aids, later to be described, the departure from planarity can be visually minimized so that it is practically unnoticeable for angles within the ranges above indicated.

The needle 40 is read against a dial 46 disposed in back of the same and within the housing 24. Said dial may be calibrated in any suitable manner, the type of calibration indicated in FIG. 1 being that for a null indicator, i.e. one in which the input is such that the needle is read in terms of diversion from a central position. It will be seen in FIG. 1 that the central position is denoted by a marker such as a dot or a circle and that the extreme positions are denoted by words, to wit, "Fast" and "Slow." Obviously the optimum value of the input signal corresponds to a central position of the needle 40 which indicates that the condition being observed is neither too great nor too small.

The dial 46 may be plane, i.e. flat, and parallel to the substantially flat front face and substantially flat protective panel 34. In this event the dial must be set back behind the needle 40 a distance sufficiently far to permit said needle to experience its arcuate movement, i.e. arcuate as viewed in front projection. In other words because the axis of rotation of the output shaft 38 is inclined at an angle substantially different from 90° to the front face of the indicator 22, the needle 40 as it travels through its conical path to either side of its mid-position experiences a progressively increasing slight rearward departure from the front face of the indicator 22, assuming the latter to be flat. This change in what may be called the depth of the needle from the front of the indicator is at a minimum when the needle is at its central position, varies rather slowly as the needle initially departs from its central position and does not vary rapidly within the range of permissible movement above indicated for the needle 40.

However, I find it convenient, in order to avoid parallax in reading the needle, to employ a dial 46 of arcuate configuration which either accurately or approximately matches the path of movement of the needle. In other words the dial 46 may be of oval curvature in plan, i.e. generated by a line parallel to the front face of the indicator 22 and moving through that portion of the ellipse formed by the projection of the path of travel of the needle 40 on a plane perpendicular to the needle 40 in its central position.

Although the use of such an elliptical path effectively avoids parallax, if desired the dial 46 may be conical so that an absolute uniformity of position may be maintained between it and all portions of the needle 40 in all positions of said needle within the limits of permissible movement thereof.

Preferably the driving mechanism 36 includes suitable stops, not shown, of conventional construction for limiting the movement of the needle 40 to the extent described above. Alternatively such stops can be provided on the dial 46.

Although the variation in depth of position of the needle (departure from the front face of the casing) is hardly noticeable within the limited path of movement that I permit, such variation can be minimized by utilizing different optical effects and in the preferred form of my invention one or more of these is employed.

One manner of minimizing the variation in depth of positions of the needle as it swings in its conical path is to darken the interior of the casing 24 and preferably the dial 46, except for the markings thereon, so that the viewer is not provided with a reference within the indicator 22 against which to judge variations in the depth of position of the needle. To this end the portion of the interior of the casing viewable through the transparent protective panel 34 is dark colored, preferably black, and desirably a nonreflective black, i.e. a matte black. This includes the dial 46 except for its markings or calibrations. On the other hand the needle 34 is made light-colored or even glowing so that it is difficult to distinguish variations in the depth of its position.

In addition I block from view the top and bottom of the needle with the top and bottom edges of the opening 32 and I make these top and bottom edges concentric with the pseudo center of the needle 40, in this instance the center about which the needle 20 turns. This prevents the user of the indicator 22 from seeing the actual elliptical nature of the front projection of the path traversed by the ends of the needle 40 and therefore enhances the apparent plane circular movement of said needle, thereby enhancing the illusion that there is no variation in the depth of the position of the needle as it swings from side to side.

It may be mentioned that although the connecting element 42 here is shown as offset to extend over the top edge of the dial 46 my invention will function with equal facility where said element is offset to extend beneath the bottom edge of said dial. The illustrated construction simply has proved to be the more convenient of the two arrangements.

It also will be appreciated that the indicator 22 provides the desired angular movement about a pseudo center even in the absence of the first indicator 10 so that the indicator 22 may be used by itself.

There are many conditions where it is desirable to locate two indicators in such a fashion that the needles thereof can readily be scanned concurrently by a pilot who interprets them jointly for manipulation of airplane controls. For example, the principal indicator 10 may denote air speed and the second indicator 22 may denote lift or may denote the ratio of the speed of the airplane to the speed which is proper for the prevailing lift so that if the airplane is going too fast, the needle 40 will swing to the right and if to slow will swing to the left. Thereby the pilot will see two needles moving about a common center one of them reading air speed in the usual manner and the other denoting whether the speed is too fast or too slow for some maneuver, e.g. take-off or landing.

Because the indicator 22 herein shown is a null indicator, under certain circumstances it may provide an improper reading that should be disregarded. This is obviated by including an "Off-On" signal. Any suitable "Off-On" device can be employed, the same constituting, for instance, a relay 48 which actuates a shaft 50 connected by a wire 52 to a flag 54. The flag can be read through an opening 56 in the dial 46. When the relay is de-energized the flag drops out of sight whereupon the pilot will pay attention to the position of the needle 40.

It will thus be seen that I have provided a device which achieves several objects of my invention and which is well adapted to meet the conditions of practical use.

As various possible embodiments might be made of my above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent,

1. An indicator comprising a casing having a front face, an actuating shaft, a needle adjacent said face, means connecting said needle to said shaft to be driven thereby, and means mounting the shaft for rotation so that the needle turns through the forward half of a conical path which the needle generates as it turns about the axis of rotation of the shaft, said axis of rotation being inclined from about 20° to about 70° to said front fact so that the base circle of the conical path lies in a plane inclined to the front face and the front projection of said circle is an ellipse, said shaft being wholly contained within said casing and the axis of rotation thereof intersecting the plane of said front face at a point remote from the casing.

2. An indicator comprising a casing having a front face, an actuating shaft in back of and remote from said front face, a needle adjacent said face, means connecting said needle to said shaft to be driven thereby, and means mounting the shaft for rotation so that the needle turns through the forward half of a conical path which the needle generates as it rotates about the axis of rotation of the shaft, said axis of rotation being inclined from about 20° to about 70° to said front face so that the base circle of the conical path lies in a plane inclined to the front face and the front projection of said circle is an ellipse, the longitudinal axis of said needle and the axis of rotation of said drive shaft intersecting at a point external to said casing, the angle between the needle and the drive shaft being approximately equal to the angle between the actuating shaft and said front face.

3. An indicator comprising a casing having a front face, a marker, means mounting the marker for rotation through an arc in the forward half of a circle which the marker generates as it turns about an axis, said axis being inclined from about 20° to about 70° to said front face so that said circle lies in a plane inclined to the front face and the front projection of said circle is an ellipse, and a dial conical with respect to the axis of rotation of the marker and located behind the marker.

4. An indicator comprising a casing having a front face and a non-reflective dark colored interior, a marker, and means mounting the marker for rotation through an arc in the forward half of a circle which the marker generates as it turns about an axis, said axis being inclined from about 20° to about 70° to said front face so that said circle lies in a plane inclined to the front face and the front projection of said circle is an ellipse.

5. An indicator comprising a casing having a front face and a non-reflective dark colored interior, a light-colored marker, and means mounting the marker for rotation through an arc in the forward half of a circle which the marker generates as it turns about an axis, said axis being inclined from about 20° to about 70° to said front face so that said circle lies in a plane inclined to the front face and the front projection of said circle is an ellipse.

6. An indicator comprising a casing having a front face, an actuating shaft, a needle adjacent said face, means connecting said needle to said shaft to be driven thereby, and means mounting the shaft for rotation so that the needle turns through the forward half of a conical path which the needle generates as it turns about the axis of rotation of said shaft, said axis of rotation being inclined from about 20° to about 70° to said front face so that the base circle of the conical path lies in a plane inclined to the front face and the front projection of said circle is an ellipse, said casing having an opening in the front face through which the needle is visible and which blocks view of the ends of the needle.

7. An indicator as set forth in claim 6, wherein the upper and lower edges of the opening are concentric circular arcs.

8. For use with a first indicator having a casing with a front face, a marker, and means mounting the marker for rotation about an axis normal to said front face: a second indicator having a front face, a marker, and means mounting the marker of the second indicator for rotation through an arc in the forward half of a circle which the marker generates as it turns about an axis, said axis being inclined from about 20° to about 70° to the front faces of both indicators so that said circle lies in a plane inclined to the front faces and the front projection of said circle is an ellipse, and said inclined axis intersecting the axis of rotation of the first indicator adjacent the front face thereof.

9. In combination, a first indicator having a casing with a front face, a marker, and means mounting the marker for rotation about an axis normal to said front face; and a second indicator having a front face, a marker, and means mounting the marker of the second indicator for rotation through an arc in the forward half of a circle which the marker generates as it turns about an axis, said axis being inclined from about 20° to about 70° to the front faces of both indicators so that said circle lies in a plane inclined to the front faces and the front projection of said circle is an ellipse and said inclined axis intersecting the axis of rotation of the first indicator adjacent the front face thereof.

References Cited in the file of this patent

UNITED STATES PATENTS

| | | |
|---|---|---|
| 1,810,355 | Kingsford et al. | June 16, 1931 |
| 2,127,807 | Carbonara | Aug. 23, 1938 |
| 2,660,977 | Gordon | Dec. 1, 1953 |
| 2,885,254 | Dinger et al. | May 5, 1959 |